(12) United States Patent
Huang et al.

(10) Patent No.: US 8,910,223 B2
(45) Date of Patent: Dec. 9, 2014

(54) LAYERED CODED STREAMING CONTROL FOR UNICAST/MBMS INTERACTION

(75) Inventors: Leping Huang, Tokyo (JP); Kodo Shu, Kanagawa (JP)

(73) Assignee: Nokia Coporation, Espoo (FI)

(*) Notice: Subject to any disclaimer, the term of this patent is extended or adjusted under 35 U.S.C. 154(b) by 942 days.

(21) Appl. No.: 12/447,145

(22) PCT Filed: Oct. 24, 2007

(86) PCT No.: PCT/IB2007/003191
§ 371 (c)(1),
(2), (4) Date: May 24, 2010

(87) PCT Pub. No.: WO2008/050220
PCT Pub. Date: May 2, 2008

(65) Prior Publication Data
US 2010/0263012 A1    Oct. 14, 2010

Related U.S. Application Data

(60) Provisional application No. 60/854,576, filed on Oct. 25, 2006.

(51) Int. Cl.
*H04N 7/173* (2011.01)
*H04L 29/06* (2006.01)
(52) U.S. Cl.
CPC ...... *H04L 29/06027* (2013.01); *H04L 65/4076* (2013.01); *H04L 65/604* (2013.01); *H04L 65/80* (2013.01)
USPC .................. 725/95; 725/86; 725/87; 725/93; 725/116
(58) Field of Classification Search
None
See application file for complete search history.

(56) References Cited

U.S. PATENT DOCUMENTS 6,496,980 B1 * 12/2002 Tillman et al. ............... 725/90
6,510,553 B1 * 1/2003 Hazra ............................ 725/87
6,798,838 B1 * 9/2004 Ngo ......................... 375/240.19
(Continued)

FOREIGN PATENT DOCUMENTS

WO    2005/039186 A1    4/2005
WO    2006/010373 A1    2/2006

OTHER PUBLICATIONS

"LTE System Performance Improvement by Unicast/MBMS Superposition and Interference Cancellation", 3GPP RAN1 LTE Ad Hoc, R1-061702, Agenda Item 7.5, Jun. 27-30, 2006, pp. 1-10.

(Continued)

*Primary Examiner* — Nasser Goodarzi
*Assistant Examiner* — Fred Peng
(74) *Attorney, Agent, or Firm* — Harrington & Smith (57) ABSTRACT

A higher network sends a base stream of a data stream to a first network node, and sends an enhancement stream of the data stream to a second network node. The first network node transmits the base stream over a multicast channel and the second network node transmits the enhanced stream in synchronism with the transmitted base stream over a unicast channel. Various options are detailed for how this synchronism is achieved, and the second network node need only transmit the higher bit-rate enhancement stream on user request or if network conditions permit. A user equipment receives the base and enhancement streams, combines them, and displays the combined stream to a user at a graphical display interface. Various apparatus, methods, and computer programs are detailed for various nodes and the user equipment.

19 Claims, 4 Drawing Sheets

(56) References Cited

U.S. PATENT DOCUMENTS

| | | | |
|---|---|---|---|
| 2003/0135863 A1* | 7/2003 | Van Der Schaar | 725/95 |
| 2004/0205338 A1* | 10/2004 | Bertin | 713/163 |
| 2006/0168632 A1* | 7/2006 | Honda et al. | 725/95 |
| 2006/0200848 A1* | 9/2006 | Baldine-Brunel et al. | 725/90 |
| 2007/0056000 A1* | 3/2007 | Pantalone et al. | 725/90 |
| 2007/0074266 A1* | 3/2007 | Raveendran et al. | 725/135 |
| 2010/0011393 A1* | 1/2010 | Lecomte et al. | 725/31 |
| 2011/0113453 A1* | 5/2011 | Ralston et al. | 725/62 |

OTHER PUBLICATIONS

"Draft ITU-T Recommendation and Final Draft International Standard of Joint Video Specification (ITU-T Rec. H.264 |ISO/IEC 14496-10 AVC)", Joint Video Team (JVT) of ISO/IEC MPEG & ITU-T VCEG, 8th Meeting, May 23-27, 2003, pp. 269.

McCanne et al., "Low-Complexity Video Coding for Receiver-Driven Layered Multicast", IEEE Journal on Selected Areas in Communications, vol. 15, No. 6, Aug. 1997, pp. 983-1001.

"MBMS transmissions & Synchronization requirements and removal of note 1", 3GPP TSG•RAN WG2, Meeting 54, TS 25.813, Revision 2, Current version 7.0.0, R2-062728, Aug. 28-Sep. 1, 2006, 9 pages.

International Search Report and Written Opinion received for corresponding Patent Cooperation Treaty Application No. PCT/IB2007/003191, dated Apr. 3, 2008, 11 pages.

* cited by examiner

FIG. 1
PRIOR ART
THE ARCHITECTURE OF MBMS

LAYERED CODED STREAMING CONTROL FOR UNICAST/MBMS INTERACTION

RELATED APPLICATION

This application was originally filed as PCT Application No. PCT/IB2007/003191 filed Oct. 24, 2007 and claims the priority of U.S. Patent Application No. 60/854,576 filed Oct. 25, 2006, incorporated by reference herewith.

TECHNICAL FIELD

The teachings detailed herein relate to wireless communications, and particularly to wireless signals split among a base layer and related layers commonly termed enhancement layers that are derived from the same originating signal.

BACKGROUND

The following abbreviations that appear in the ensuing description are defined as follows:
GSM: global system for mobile communications;
GPRS: general packet radio service;
MCH: multicast channel;
NTSC: national television system(s) committee;
OFDM: orthogonal frequency division multiplexing;
RTP: real-time transport protocol;
RTCP: RTP control protocol;
SCH: shared channel;
UMTS: universal mobile telecommunication system.

Multimedia broadcast/multicast service (MBMS) will provide the capability for data from a single source entity to be transmitted to multiple endpoints. MBMS is an internet protocol datacast (IPDC) service that can be offered via existing UMTS and GSM wireless networks. MBMS differs from broadcast in that the recipient/user of a broadcast signal need not be a subscriber; MBMS is a subscription based technology (whether paid or free) because the user must be a member of the multicast group to receive the MBMS signal. Further, MBMS provides a feedback channel for user interaction, whereas broadcast does not enable such functionality (though content in MBMS is still one-way only).

MBMS is a UMTS feature, which was finalized in June 2005 as 3GPP Release 6. Strong initial acceptance indicates that first networks, then individual user equipment UE, will support MBMS in the near term on an increasingly broad basis. MBMS technology preserves capacity and reduces costs by providing an efficient means to reliably distribute multimedia content over 3G networks. As a potential fee-based service, it also represents an unrealized potential revenue stream for wireless network operators, so much research has gone into developing MBMS.

Figure 1:
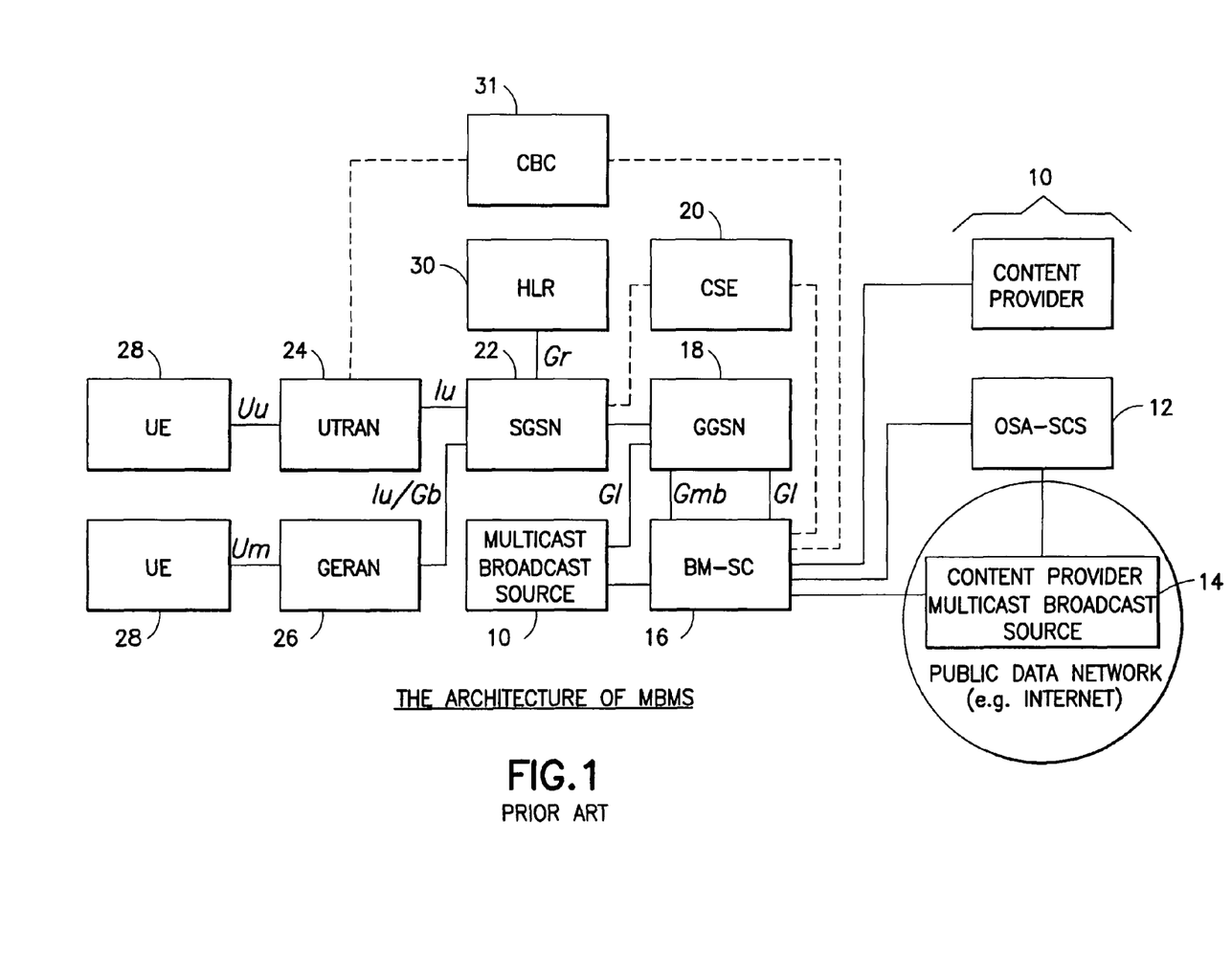
FIG. 1 is a prior art schematic view of MBMS architecture.

A typical MBMS environment is illustrated in prior art FIG. 1. The content to be sent to a user may be provided by any of several sources 10, including an open service access point 12 or the Internet 14, and channeled through a broadcast/multicast service center BM-SC 16. It then routes through a gateway general packet radio service (GPRS) support node GGSN 18 and possibly also a backup camel server CSE 20 to a serving GPRS support node SGSN 22. From there the signal is sent to a wireless network, such as a UTRAN (UMTS terrestrial radio access network) 24 and/or a GERAN (GSM EDGE radio access network) 26, which provides the MBMS signal through its node B's or base transceiver stations (not separately shown in FIG. 1) to the various user equipment UE 28 within those networks under control of the node B's. A home location register HLR 30 may be checked by the SGSN 22 to determine which UEs 28 are in the multicast group. A cell broadcast center CBC 31 may also link the broadcast/multicast service center BM-SC 16 to the wireless networks 24, 26 to determine which UE's are entitled to receive additional data, for example, the enhancement channels described below.

Streaming applications (e.g. mobile digital TV) is anticipated to become a significant aspect in the long term evolution LTE (also known as 3.9G or E-UTRAN of the third generation partnership project 3GPP) of MBMS. Layered coding is a popular way of transmitting video streaming over the Internet to adapt to the changes of path delay, path bandwidth and path error on the Internet. Rate scalability of the streaming can be elegantly achieved by scalable video codecs that provide layered embedded bit-streams that are decodable at different bitrates, with gracefully degrading quality. Layered representations for Internet streaming have been widely studied. In addition, scalable representations have become part of established video coding standards, such as MPEG and ITU-T H.263 et seq. Scalable video representations aid in transport control protocol TCP-friendly streaming, as they provide a convenient way for performing the rate control required to mitigate network congestion. In receiver-driven layered multicasting, video layers are sent in different multicast groups, and rate control is performed individually by each receiver by subscribing to the appropriate groups. Layered video representations have further been proposed in combination with differentiated quality of service (DiffServ) in the Internet. The idea is to transmit the more important layers with better, but more expensive, quality of service (QoS), and the less important layers with fewer or no QoS guarantees.

For example, a scalable representation of video signals may consist of a base layer and multiple enhancement layers. The base layer provides a basic level of quality and can be decoded independently of the enhancement layers. On the other hand, the enhancement layers serve only to refine the base layer quality and alone are not useful. Therefore, the base layer represents the most critical part of the scalable representation, which makes the performance of streaming applications that employ layered representations sensitive to losses of base layer packets.

Further background detail concerning base and enhancement layers may be found at International Publication No. WO 2005/039186 published on Apr. 28, 2005 and entitled SCALEABLE ENCODING FOR MULTICAST BROADCAST MULTIMEDIA SERVICES, by Lorenzo Casaccia et al. Briefly, that document is seen to describe splitting MBMS content into a base layer (e.g., video in low quality/resolution and only a black and white color scheme) and one or more enhancement layers (e.g., data for increased quality/resolution and color).

Digital TV is considered a service for LTE MBMS with potentially wide adoption potential, but it requires a very large bandwidth. For example, one MPEG2 HDTV (motion picture expert group 2, high definition television) streaming video needs 15-20M bps (million bits per second). It is technically and economically inefficient to transmit the whole HDTV streaming signal over dedicated MBMS channels.

Further, MBMS single frequency networks require synchronization between MBMS Node Bs (e-Node Bs in E-UTRAN). If MBMS functionality is integrated into existing unicast e-Node Bs, it will result in a fully synchronized radio access network. This is seen as a distinct disadvantage because full synchronization would restrict individual cells in the network from allocating their radio resources (e.g., bandwidth, spreading codes, temporary identifiers, etc.) as freely as they do now, resulting in overall decreased efficiency.

Additionally, LTE tends toward an asynchronous mode for the e-Node Bs operating for unicast services.

There are several constraints to keep in mind when developing MBMS. The relevant 3GPP technical specification TS 25.813 stipulates that the E-UTRA/E-UTRAN (where the prefix E represents "evolved") network permit simultaneous, tightly integrated, and efficient provisioning of dedicated (e.g., unicast) and MBMS services to the user; that MBMS transmissions from several e-Node B's may be coordinated; and that MBMS may be provided on a frequency layer dedicated to MBMS as well as on a frequency layer shared with non-MBMS services. The frequency layer dedicated to MBMS is to be a set of cells dedicated to MBMS, whereas the frequency layer shared with non-MBMS services is to be a set of cells supporting both unicast and MBMS services. Coordination of MBMS transmissions within a single frequency network SFN may be done among several e-Node B's of that same SFN area, and SFN's may be differently defined in multiple SFN areas.

What is needed in the art is a way to efficiently use available bandwidth for multimedia transmissions (e.g., base and enhancement layers) while not overly burdening the system doing the transmitting by requiring tight synchronization across the entire multimedia transmissions and/or inherently restricting the network's flexibility in executing its other functions such as handling uplink and downlink user data (e.g., regular wireless phone calls or exchange of messages).

SUMMARY

According to an embodiment of the invention is a method that includes sending a base stream of a data stream to a first network node for transmission to user equipment, and sending an enhancement stream of the data stream to a second network node for transmission to user equipment.

According to another embodiment of the invention is a computer readable memory embodying a program of machine-readable instructions executable by a digital data processor to perform actions directed toward providing multimedia services to user equipment. In this embodiment the actions include sending a base stream of a data stream to a first network node for transmission to user equipment, and sending an enhancement stream of the data stream to a second network node for transmission to user equipment.

According to another embodiment of the invention is an apparatus that includes a first data interface adapted to send a base stream of a data stream to a first network node for transmission to user equipment, and a second data interface adapted to send an enhancement stream of the data stream to a second network node for transmission to user equipment.

According to another embodiment of the invention is a method that includes receiving at a network node an enhanced stream portion of a data stream and a synchronization signal for synchronizing the enhanced stream portion with a base stream portion of the data stream, and transmitting from the network node the enhanced stream portion in synchronism with the base stream portion according to the synchronization signal, wherein the network node does not additionally transmit the base stream portion.

According to another embodiment of the invention is a computer readable memory embodying a program of machine-readable instructions executable by a digital data processor to perform actions directed toward providing multimedia services to user equipment. In this embodiment the actions include receiving at a network node an enhanced stream portion of a data stream and a synchronization signal for synchronizing the enhanced stream portion with a base stream portion of the data stream, and transmitting from the network node the enhanced stream portion in synchronism with the base stream portion according to the synchronization signal, wherein the network node does not additionally transmit the base stream portion.

According to a further embodiment of the invention is an apparatus that includes at least one data interface adapted to receive an enhanced stream portion of a data stream and a synchronization signal for synchronizing the enhanced stream portion with a base stream portion of the data stream, and a transceiver adapted to transmit the enhanced stream portion in synchronism with the base stream portion according to the synchronization signal, without additionally transmitting the base stream portion.

According to still another embodiment of the invention is a system that includes a first network node, a second network node, and a higher network node coupled to each of the first and the second network nodes. The higher network node is adapted to send a base stream of a data stream to the first network node and to send an enhancement stream of the data stream to the second network node. The first network node is adapted to transmit the base stream. The second network node is adapted to transmit the enhanced stream in synchronism with the transmitted base stream.

According to another embodiment of the invention is a method that includes receiving from a first network node a base stream, receiving from a second network node an enhancement stream, combining the received base stream with the received enhancement stream into a combined unitary stream, and displaying the combined unitary stream to a user.

According to another embodiment of the invention is a computer readable memory embodying a program of machine-readable instructions executable by a digital data processor to perform actions directed toward processing received multimedia services. In this embodiment the actions include receiving from a first network node a base stream, receiving from a second network node an enhancement stream, combining the received base stream with the received enhancement stream into a combined unitary stream, and displaying the combined unitary stream to a user.

According to a still further embodiment of the invention is a device that includes at least one transceiver, a processor and a graphical display interface. The at least one transceiver is adapted to receive from a first network node a base stream and to receive from a second network node an enhancement stream. The processor is adapted to combine the received base stream with the received enhancement stream into a combined unitary stream. The graphical display interface is coupled to the processor and is adapted to display the combined unitary stream to a user.

These and other aspects are detailed with particularity below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

A starting point to understand embodiments of this invention is that the content stream for access by users is separated into two (or more) flows by layered coding: a base flow and one or more enhancement flows. The exact node that divides the initial stream into the multiple flows may vary from implementation to implementation, as such implementations are related to the wireless network portion of FIG. 1. Note that the two or more flows can be divided first in the wireless network (e.g., the UTRAN 24 or GERAN 26 nodes) as well as upstream of the wireless network (e.g., at the BM-SC 16 or GGSN 18). The wireless network 24, 26 transmits the base flow over its MBMS cells to all UEs 28 in the service area, but transmits the enhancement flow(s) on selected cells. The enhanced flows may be transmitted based on the UEs' demand and that cell's radio/traffic condition. High resolution digital TV is seen as a viable application for this invention. This split of flow transmission among different cells supports high bitrate streaming applications in a flexible and spectrum efficient way, and reduces the complexity of e-Node Bs and relieves synchronization requirements between those e-Node Bs (which are meant for transferring unicast traffic). This is because the tight synchronization (within the length of a cyclic prefix CP) will be required only on MBMS cells, not on the unicast cells.

Figure 2:
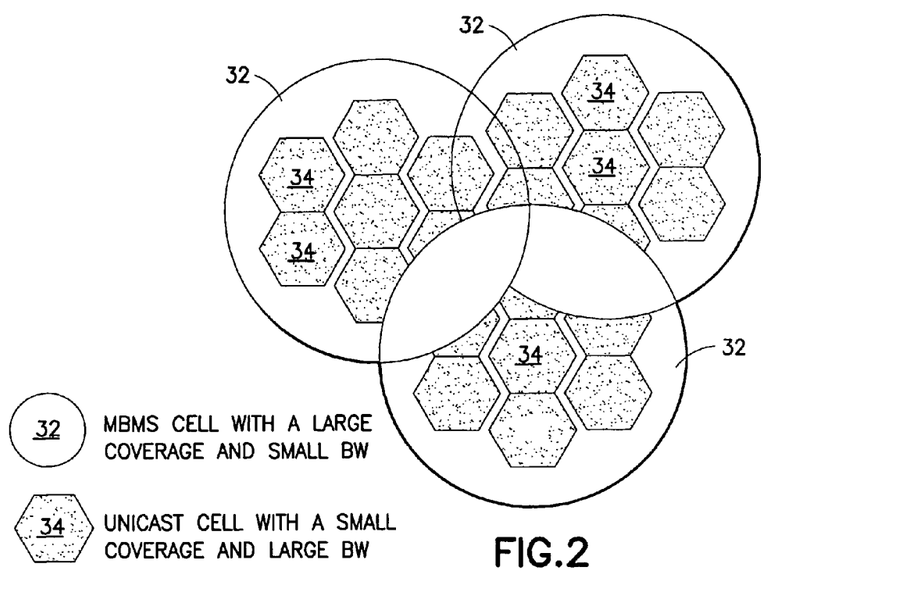
FIG. 2 is a schematic diagram of MBMS cells and unicast cells in overlapping coverage areas.

FIG. 2 shows an example of an integrated MBMS/unicast network. A MBMS cell 32 typically has small bandwidth BW and covers relatively large geographic areas. A unicast cell 34 (or a single cell MBMS) has larger BW and coves relatively smaller geographic areas.

In accordance with an embodiment of this invention, a streaming application is coded into a base layer and an enhancement layer (streams). The base layer is transmitted over MBMS cells 32, while the enhancement layer is transmitted over selected unicast cells 34. The base layer guarantees the basic quality of an application (e.g. low resolution, very small number of frames/second), and the enhancement layer contains the difference of information between high resolution streaming and low (basic) resolution streaming.

While described in the context of one base layer and one enhancement layer, any of several enhancement layers may be transmitted in accordance with these teachings in various ways. For example, in one embodiment, all enhancement layers are transmitted from unicast cells 34 separate from the MBMS cells 32 that transmit the base layer. In another embodiment, the base layer and one or more (preferably lower bitrate) enhancement layers may be sent in the MBMS cells 32 and the remaining enhancement layers may be sent from the e-Node Bs in the unicast cells 34. In a particularly useful embodiment, the e-Node B selects whether to schedule the enhancement layer on its cell 34 based on user demand and current usage of radio resources. For example, if there are strong UE requirement to receive high resolution video, and there are spare radio resources, then the e-Node B can schedule the enhancement layer. Otherwise the e-Node B will not schedule the enhancement layer, it will not be transmitted in the cell in which a particular UE is operating, and that UE can only receive the base layer streaming data. In this manner, the e-Node B dynamically determines which, if any, enhancement layers to transmit based on either or both of user demand and current or predicted traffic.

The specific algorithms to split the base and enhancement layers from an original data stream by layered coding are known in the art, and may be enhanced as research in that area progresses. For example, some existing commercial standards like MPEG4 and ITU-T H.264 describe layered coding. Further example may be seen in an article by S. R. McCanne, M. Vetterli, and V. Jacobson, entitled LOW-COMPLEXITY VIDEO CODING FOR RECEIVER-DRIVEN LAYERED MULTICAST, published in *IEEE J. Selected Areas in Communications*, vol. 15, no. 6, pp. 983-1001 (August 1997).

As an example, assume that the base stream, termed stream 1, includes video in low quality and in color; and that the enhancement stream, termed stream 2, includes refinements to the video information of stream 1. According to an embodiment of the invention, stream 1 is transmitted in the MBMS cell 32, while stream 2 is transmitted in the unicast cell 34.

Figure 3:
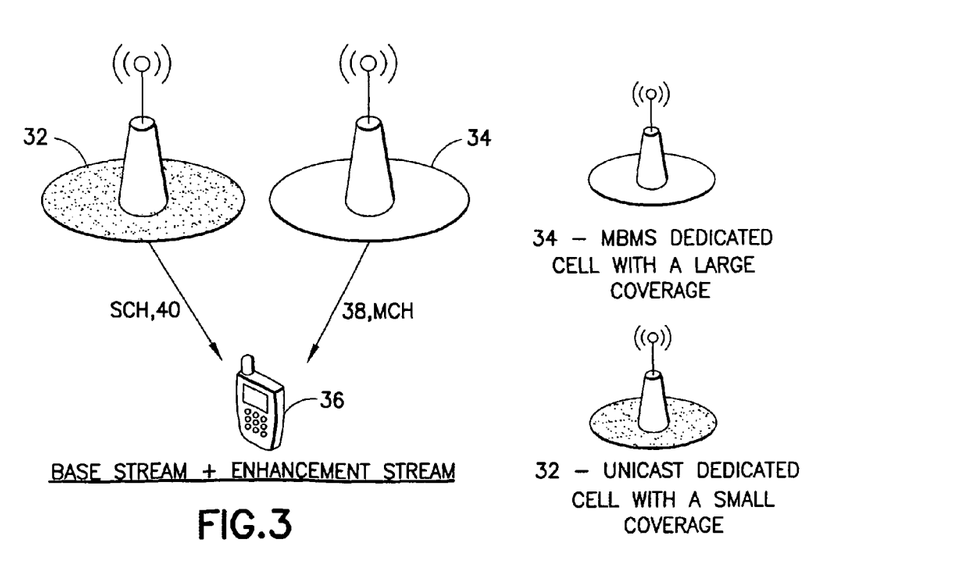
FIG. 3 is a schematic diagram showing a user equipment receiving signals according to an embodiment of this invention.

FIG. 3 illustrates interaction between the unicast cell 34 and the MBMS cell 32 in more detail. The base layer/stream 38 is transmitted via the MBMS cell 32, such as via a multicast channel MCH. The enhancement layer/stream 40 is transmitted by the unicast cell 34, such as via a shared channel SCH. These two layers 38, 40 are separately received at the UE 36 and combined at the application layer within that UE 36.

Having described aspects of the invention broadly, it can be sent these aspects differ substantially from WO 2005/039186, as described in the background section above. Specifically, WO 2005/039186 utilizes the general idea of basic and enhanced streams, but is directed toward a single carrier system (i.e., one MBMS carrier in either of GSM or OFDM system). That publication teaches disposing the different streams in different time slots (for GSM) or different sub carrier (for OFDM) of the same carrier. The UE then decides which stream(s) to decode based on the UE's capability and desire. This may prove beneficial in a high-speed packet access HSPA-type of system, where the UE can not decode sub frames continuously because of power consumption and limit of receiver buffer. However, regardless of the UE's choice of which streams to decode, the entire high bitrate stream (the enhancement stream) is seen to be always transmitted in WO 2005/039186, though as a separate stream from the basic stream.

In contradistinction, embodiments of this invention use interaction of multiple carriers (e.g., unicast and MBMS in an OFDM/LTE system). The original multimedia stream is split, but the base stream 38 is sent on the MBMS carrier/cell 32 while the enhancement stream 40 is sent on a unicast carrier/cell 34. The UE 36 can, by default, receive the base stream 38 anywhere in the wireless system. To receive the enhancement stream 40, in an embodiment the UE 36 sends a request to the unicast cell 34 for that enhancement stream 40 which is sent by the unicast cell 34. Two benefits are realized: (1) spectrum efficiency; and (2) loose synchronization.

An example proves how spectrum efficiency may be realized. Assume the following: a full video stream needs 2 MHz spectrum; the base stream 38 needs 0.2 MHz spectrum, and the enhancement stream 40 needs 1.8 MHz spectrum. Assume further that 10% of the UEs 36 in each cell need the full quality video stream (both streams 38, 40). With these assumptions, if the full quality video stream (38 and 40) is broadcast in the MBMS spectrum, it would occupy a 2 MHz spectrum. If instead only the base stream 38 is broadcast in the MBMS spectrum, then to satisfy those 10% of UEs requesting the enhanced stream 40 adds another 0.18 MHz to the base stream spectrum, and the total spectrum occupied is 0.2 MHz+1.8 MHz*10%=0.38 MHz (on average).

The benefit of loose synchronization is important for 3GPP, because 3GPP generally seeks to avoid tight synchronization between base stations. If MBMS functionality is integrated into an existing unicast e-Node B, it will results in a fully synchronized radio access network. This is seen as a distinct disadvantage because full synchronization would restrict individual cells in the network from allocating their radio resources (e.g., bandwidth, spreading codes, temporary identifiers, etc.) as freely as they do now, resulting in overall decreased efficiency, and large signaling between base stations. Embodiments of this invention avoid the need for tight synchronization between unicast base stations and MBMS base stations. However, some synchronization is still expected under 3GPP between MBMS cells 32 so as to handover a UE 36 receiving the base stream 38. Some additional signaling between MBMS Node B 32 and unicast Node B 34, according to aspects of this invention, can loosely synchronize the base stream 38 with the enhancement stream 40, detailed further below.

It was noted above that splitting of the original signal may occur at different points in the MBMS architecture. Two approaches are detailed. One approach is to employ a transcoder server inside the core network (e.g., the wireless networks 24, 26 of FIG. 1, but above the node B level). This transcoder server converts (splits) one video stream into the baseline stream 38 and the enhancement stream 40. Some signaling between the UE 36 and this transcoder server will be needed for media synchronization, and the synchronization signaling may be appended to one or both of the base and enhanced streams 38, 40. If the IETF (Internet engineering task force) family of protocol is used, the RTP can be used to transmit the stream, while the RTCP can be used to transmit control signaling (mainly synchronization signaling).

Another approach as to where to split the original full-quality signal is that the sender/server itself (e.g. a website that stores the video, the source 10, 12, 14 of FIG. 1 or the BM-SC 16) provides two streams (baseline and enhancement). The transcode server noted above would not be necessary in this approach. RTP/RTCP can also be used here for the data and control channels. The wireless network operator would lose some freedom about how to split the original stream into the base and enhancement streams 38, 40 in this approach, and the server making the split may need to prepare different combinations of baseline and enhancement streams for different wireless networks 24, 26.

The loose synchronization is now detailed. Assume that the baseline stream 38 is broadcast via the MBMS cell/channel 38. All the UEs 36 in that cell 32 receive this base stream 38 at the same time. No new synchronization protocol is added here, and there is no feedback channel from the UE 36 to synchronize the baseline MBMS stream 38. In other words, the timing of the baseline stream 38, broadcast via the MBMS channel 38, serves as reference timing to the enhancement streams 40, as will be seen.

The UE 36 needs some synchronization protocol for the enhancement stream 40 when it requests the "full" video stream (i.e., when it sends the request for the enhancement stream 40). This is because the enhancement stream 40 is sent via the downlink SCH in the unicast cell 34, and it is prudent to expect some delay/jitter in the radio access network RAN. In embodiments of this invention, the synchronization will be very loose and depends on the UE's buffer size in which it temporarily stores/buffers the base stream 38 and/or enhancement stream 40. Assume for example a NTSC (national televisions standards committee) stream, 30 video frames/second. The synchronization requirements can then be e.g. 66 ms (+/− one frame) between the enhancement 40 and baseline 38 streams.

In a change request to 3GPP TS 25.813 [T-Doc R2-062728; 3GPP TSG-RAN WG2 Meeting #54 (Tallin, Estonia, 28 Aug. to 1 Sep. 2006); MBMS TRANSMISSIONS & SYNCHRONIZATION REQUIREMENTS AND REMOVAL OF NOTE 1: TS 25.813 CHANGE REQUEST 001] there is proposed three levels of synchronization. Embodiments of this invention adds another layer of synchronization, albeit a loose one (e.g. 66 ms or higher to 1 s). Two types of synchronization protocol are detailed, and the synchronization is between the Node Bs 32, 34 that transmit the different streams 38, 40. Such synchronization may be directly between the Node Bs, or coordinated or directed by a higher node in the wireless network (e.g., a radio network controller RNC, a mobility management entity MME). The first protocol guarantees that the enhancement stream only arrives after the baseline stream, and the difference of arrival time is within one half frame (e.g., 33 ms). In this case, the UE only needs to buffer the baseline stream 38, and replay the video whenever the enhancement stream 40 arrives.

The second protocol guarantees the enhancement stream 40 arrives within about one half frame (e.g., +/−33 ms) of the arrival time of baseline stream 38, but the order of transmission/arrival of the different streams 38, 40 is not mandated. In this case, the UE 36 needs to buffer both baseline 38 and enhancement 40 streams.

Consider for example a 10 Mbps video stream, split into 1M baseline 38 and 9M enhancement 40 streams. If the first synchronization protocol is used, the maximum buffer for this application in the UE 36 will be 1M*0.033=33k. If the second synchronization protocol is used, the maximum buffer for this application in the UE 36 will be 10M*0.033=330k.

In summary, then, embodiments of this invention can (1) support high bitrate streaming application in a flexible and spectrum efficient way; (2) reduce the complexity of e-Node Bs and relieve synchronization requirements between those e-Node Bs which are meant for transferring unicast traffic, because the tight synchronization (within the length of a CP) will be required only in the MBMS cells; and (3) guarantee the channel quality of both the MBMS (base stream 38) and unicast (enhancement stream 40) channel when these two channels share the same frequency band.

Figure 4:
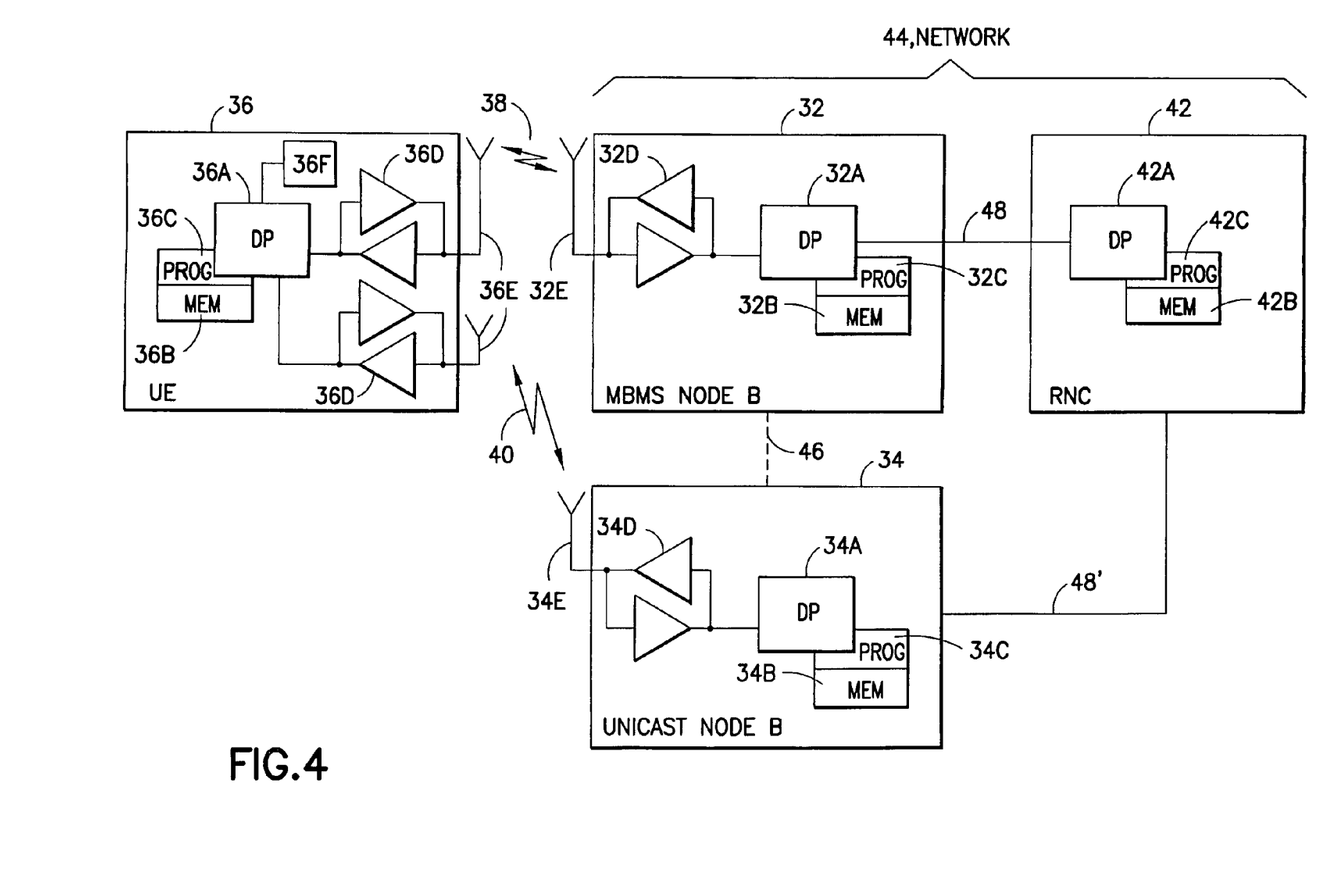
FIG. 4 is a schematic diagram of nodes of a wireless network and a representative user equipment that embody various aspects of embodiments of the invention.

FIG. 4 illustrates a schematic diagram of relevant nodes of the wireless network 44, and a representative UE 36, that may embody aspects of the invention detailed above. Embodiments of the invention may be disposed in any host computing device, and the UE 36 may be any portable, especially handheld, device that is capable of wirelessly accessing a communication network, such as a mobile telephony network of base stations that are coupled to a publicly switched telephone network or directly to the internet. A cellular telephone, a Blackberry® device, and a personal digital assistant (PDA) with internet or other two-way communication capability are examples of a UE 36.

The component blocks illustrated in FIG. 4 are functional and the functions described below may or may not be performed by a single physical entity as described with reference to FIG. 4. Not illustrated but known in the art for a UE 36 is a display driver such as a program 36C or a circuit board 36A for driving a graphical display screen/interface 36F for viewing video received according to aspects of this invention, and an input driver, such as a program or a circuit board for converting inputs from an array of user actuated buttons and/or a joystick for interfacing with a user so a user can enter a request at the UE 36 for the enhancement stream 40. The UE 36 further includes a power source such as a self-contained battery that provides electrical power to a central processor 36A that controls functions within the UE 36. Within the processor 36A are functions such as digital sampling, decimation, interpolation, encoding and decoding, modulating and demodulating, encrypting and decrypting, spreading and despreading, and additional signal processing functions known in the art that may be used to receive and decode/demodulate/despread etc. the received streams detailed above.

Computer programs 36C such as algorithms to modulate, encode and decode, data arrays such as look-up tables, and the like, as well as programs to execute the invention detailed above, are stored in a memory 36B storage which may be an electronic, optical, or magnetic memory storage media as is known in the art for storing computer readable instructions and programs and data. The main memory 36B is typically partitioned into volatile and non-volatile portions, and is commonly dispersed among different storage units, some of which may be removable. The buffer detailed above is a part of the memory 36C. The UE 36 communicates over a first network link 38, by which it receives from the MBMS e-Node B 32 the base stream 38, via one or more antennas 36E that may be selectively coupled via a T/R switch or a diplex filter to a receiver or transceiver 36D. The UE 36 is illustrated with two receivers 36D and two antennas 36E for communicating also with the unicast Node B 34 over a second wireless link 40, by which is received the enhancement stream 40. Either or both streams may be received at either or both antennas using multiple input/multiple output techniques. These streams may be combined in the UE 36 at the processor 36A.

The MBMS Node B 32 similarly has an antenna 32E (or more than one such as an antenna array) coupled to a digital processor 32A through a transmitter/transceiver 32D by which it sends the base layer/stream 38 to the UE 36. The MBMS Node B also has a memory 32B for storing programs 32C to implement aspects of this invention. The unicast Node B 34 has its own antenna 34E (or antenna array), transceiver 34D, processor 34A, and memory 34B for storing executable programs 34C. The MBMS Node B 32 may have a direct link 46 to the unicast Node B 34 for coordinating the synchronization of streams 38, 40 s detailed herein, and that direct link may be wired or wireless. Additionally, such coordination may be through a higher network node such as a gateway GW, a MME or a radio network controller RNC 42 through first and second data interfaces 48, 48'.

The GW/MME/RNC 42 similarly has a processor 42A and a memory 42B for storing programs 42C for carrying out actions in accordance with these teachings, such as directing the base stream 38 to the MBMS Node B 32 and directing the enhancement stream 40 to the unicast Node B 34. The GW/MME/RNC 42 may split the streams from the original data stream itself, or it may receive both streams 38, 40 already split. The GW/MME/RNC 42 is representative of other network nodes higher than the Node B level, which may perform that splitting and/or directing of different streams 38, 40 to different node Bs 32, 34.

The memory or memories 32B, 34B, 36B, 42B may be of any type suitable to the local technical environment and may be implemented using any suitable data storage technology, such as semiconductor-based memory devices, magnetic memory devices and systems, optical memory devices and systems, fixed memory and removable memory. The data processor(s) 32A, 34A, 36A and 42A may be of any type suitable to the local technical environment, and may include one or more of general purpose computers, special purpose computers, microprocessors, digital signal processors (DSPs) and processors based on a multi-core processor architecture, as non-limiting examples.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In accordance with embodiments of the invention, there is provided a network node, a method, and a computer program for sending a base stream split from an original data stream to a first Node B, and for sending an enhancement stream split from that original data stream to a second Node B, each stream for transmission to at least one same UE. Aspects of this invention further include a Node B (either the MBMS Node B 32 or the unicast Node B 34), method and program for synchronizing transmissions of the base and enhancement streams, within about a frame or less, between different Node B's that transmit those streams to a common UE. Further is provided a UE, method and program for a UE to receive from one Node B a base stream, to receive from another Node B an enhancement stream, and to combine both those streams into a unitary stream and display that unitary stream at a graphical display interface. Such a UE may include a buffer for one or both of those streams. Further is provided a UE, method and program for managing the buffer to store streams in the UE and for timing of displaying the combined unitary stream from both different Node Bs. Further is provided a network element, method and program for deciding whether to provide enhancement stream in a unicast Node B 34 based on either or both of a network's condition and a UE's requirement/demand.

The embodiments of this invention may be implemented by computer software executable by a data processor of the mobile station/UE 36, either Node B 32, 34, or the GW/MME/RNC 42, such as by their respective processors, software programs, or a combination of software and hardware.

Figure 5:
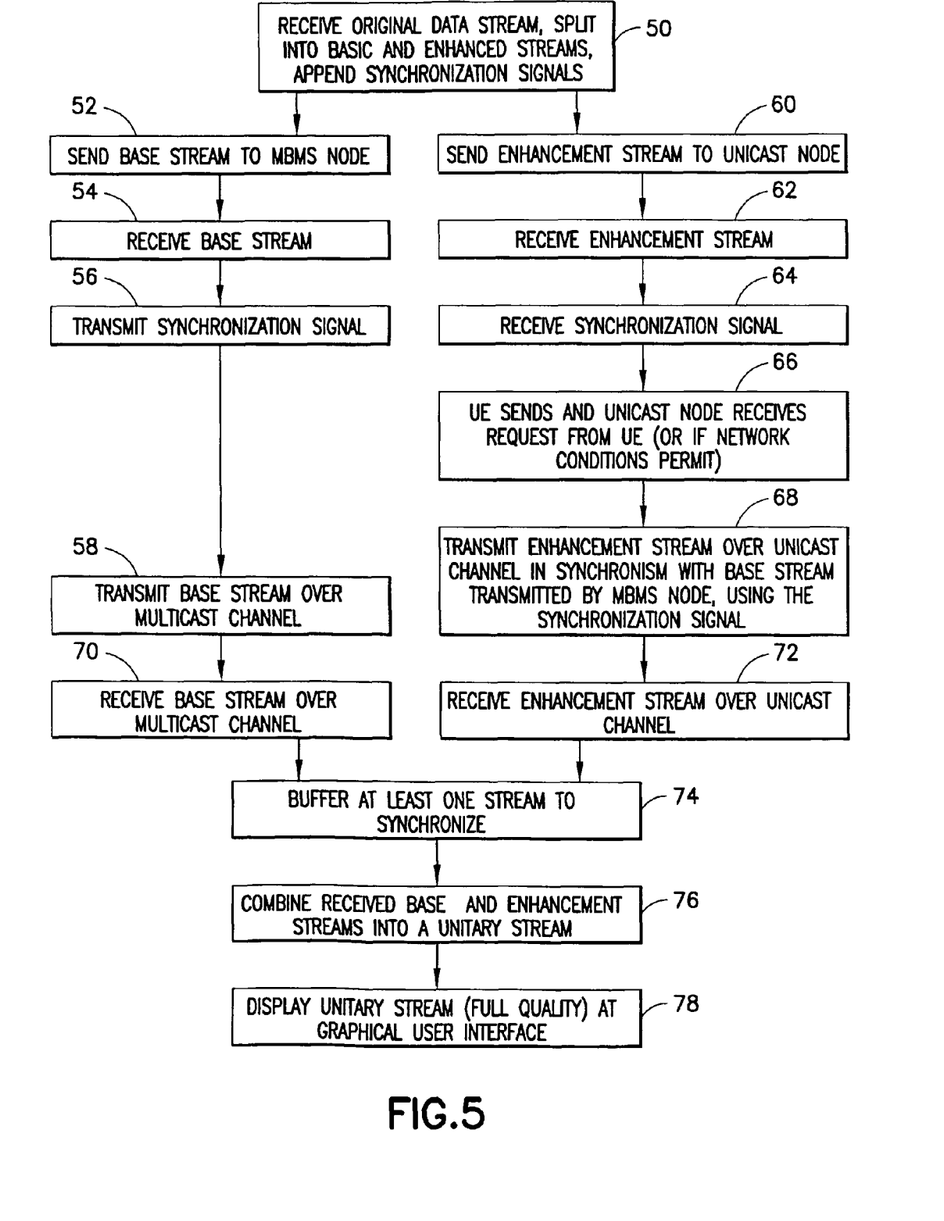
FIG. 5 is a process flow diagram illustrating actions at each of multiple network nodes and at a user equipment according to various aspects of the invention.

FIG. 5 is a process flow diagram illustrating various embodiments, including certain optional features, according to the invention as practices by multiple different nodes of the network and the user equipment. The elements of FIG. 5 may be considered method steps, or functional circuitry of an integrated circuit, or discrete instruction sets of executable code stored on a memory and readable by a processor. At block 50 the higher network node such as the GW/MME/RNC 42 receive the original data stream and split it into the basic and enhanced streams, and append to each but at least to the enhancement stream a synchronization signal. Note that these streams may be received already as separate streams at the GW/MME/RNC 42 as noted above, and need not be separated within the wireless network 44 itself but may be split at the source or elsewhere prior to being communicated to the wireless network itself. Also, as detailed above the synchronization signal need not be appended by the higher network node or even appended to either of the streams, as will be noted again below as was detailed above.

The left side of FIG. 5 generally illustrates actions at the MBMS node 32 of the wireless network 44. At block 52 the higher network node 42 sends, and at block 54 the MBMS node 32 receives the base stream but not the enhancement stream [it is noted that the base stream and one or more enhancement streams may be sent to the MBMS node 32 and transmitted on the multicast channel 38; the invention entails sending at least one enhancement stream over the unicast node 34 separate from those portions of the original signal transmitted by the MBMS node 32]. In an embodiment (such as where the higher network node 42 does not send the enhancement stream with an appended synchronization signal) the MBMS node 32 sends a synchronization signal at block 56. This is in one embodiment a control signal sent over a direct link 46, or in another embodiment the MBMS node's transmission of the base stream itself to which the unicast node 34 can slave its enhancement layer transmission. At block 58 the MBMS node 32 transmits over the multicast channel the base stream [which includes any enhancement layers it may have received with the base layer of the original signal).

The right side of FIG. 5 generally illustrates actions at the unicast node 34 of the wireless network 44. At block 60 the higher network node 42 sends, and at block 62 the unicast node 34 receives the enhancement stream (one or more of them) that was not sent to the MBMS node 32. At block 64 the unicast node 34 receives the synchronization signal. As above, this may be appended to the enhancement stream, may be via a direct control link 46 with the MBMS node 32, or may be the base stream transmitted over the multicast channel by the MBMS node 32. Other options are of course possible; those three are exemplary. In an embodiment, the unicast node 34 does not always transmit the enhancement layers, but only upon meeting a condition of block 66 that a UE in the unicast node's cell 34 requests it and/or if network conditions permit (traffic volume). At block 68 the unicast node 34 transmits the enhancement stream over a shared channel 40 in synchronism with the base stream being transmitted by the MBMS node 32 on the multicast channel 38. The synchronism is loose in an embodiment as detailed above; within one half frame and possibly only within one half frame following the companion base stream. The synchronism is determined with reference to the synchronization signal received at block 64.

The remaining portions of FIG. 5 are generally at the user equipment UE 36 (e.g., mobile telephone). At blocks 70 and 72 the UE 36 receives the respective base stream and enhancement stream from the respective MBMS and unicast nodes 32, 34 over the respective multicast and shared channels 38, 40. At least one of these (e.g., the base stream for the case where the enhancement stream is synchronized to within one half frame after the companion base stream) is buffered at block 74 in order to synchronize them within the UE 36. At block 76 the two synchronized streams are combined into a unitary stream which, assuming the UE 36 is receiving all enhancement streams, is in substance identical to the original signal from block 50 (barring normal decoding errors and channel noise). At block 78 the UE 36 then displays at a graphical user interface 36F the combined unitary stream.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above. For example, these teachings are not limited only to MBMS/unicast, but to any system where different streams split from an original stream are transmitted to an end node by different network entities, and combined in that end node after being separately received.

We claim:

1. A method comprising:
adding synchronization signaling to a first video stream, said first video stream being a base stream of a data stream;
sending the first video stream with the added synchronization signaling to at least one first network node for broadcast or multicast transmission to a plurality of user equipments;
adding synchronization signaling to a second video stream, said second video stream being an enhancement stream of the data stream;
sending the second video stream with the added synchronization signaling to a second network node for transmission to at least one user equipment of the plurality of user equipments when said at least one user equipment requests said enhancement stream, said second network node having a larger bandwidth and covering a smaller geographic area than said at least one first network node, wherein the synchronization signaling synchronizes the first video stream with the second video stream.

2. The method of claim 1, wherein sending the second video stream comprises sending the second video stream to the second network node for transmission based on at least one of a resource availability of the second network node and a second resource availability of the at least one user equipment, wherein the second network node is a unicast network node.

3. A computer readable memory embodying a program of machine-readable instructions executable by a digital data processor to perform actions directed toward providing multimedia services to user equipment, the actions comprising:

adding synchronization signaling to a first video stream, said first video stream being a base stream of a data stream;

sending the first video stream with the added synchronization signaling to at least one first network node for broadcast or multicast transmission to a plurality of user equipments;

adding synchronization signaling to a second video stream, said second video stream being an enhancement stream of the data stream;

sending the second video stream with the added synchronization signaling to a second network node for transmission to at least one user equipment of the plurality of user equipments when said at least one user equipment requests said enhancement stream, said second network node having a larger bandwidth and covering a smaller geographic area than said at least one first network node, wherein the synchronization signaling synchronizes the first video stream with the second video stream.

4. The computer readable memory embodying the program of machine-readable instructions of claim 3, wherein sending the second video stream comprises sending the second video stream to the second network node for transmission based on at least one of a resource availability of the second network node and a second resource availability of the at least one user equipment, wherein the second network node is a unicast network node.

5. An apparatus comprising:
a first data interface adapted to send a first video stream, said first video stream being a base stream of a data stream, to at least one first network node for broadcast or multicast transmission to a plurality of user equipments;
a second data interface adapted to send a second video stream, said second video stream being an enhancement stream of the data stream, to a second network node for transmission to at least one user equipment of the plurality of user equipments when said at least one user equipment requests said enhancement stream, said second network node having a larger bandwidth and covering a smaller geographic area than said at least one first network node;
a processor adapted to add synchronization signaling to the first video stream, wherein the first data interface is adapted to send the first video stream with the added synchronization signaling to the first network node; and
the processor is adapted to add synchronization signaling to the second video stream and the second data interface is adapted to send the second video stream with the added synchronization signaling to the second network node;
wherein the synchronization signaling synchronizes the first video stream with the second video stream.

6. The apparatus of claim 5, wherein the second data interface is adapted to send the second video stream to the second network node for transmission to the at least one user equipment based on at least one of a resource availability of the second network node and a second resource availability of the at least one user equipment, wherein the second network node is a unicast network node.

7. The apparatus of claim 5, further comprising a transcoder server adapted to split the data stream into the first video stream and the second video stream.

8. A method comprising:
receiving at a second network node a second video stream, said second video stream being an enhancement stream of a data stream, from a higher network node, and receiving a synchronization signal for synchronizing said second video stream with a first video stream, said first video stream being a base stream of said data stream, from a first network node, said second network node having a larger bandwidth and covering a smaller geographic area than said first network node; and
transmitting from said second network node said second video stream in synchronism with said first video stream according to said synchronization signal when said second network node receives a request for said enhancement stream from a user equipment, wherein said second network node does not additionally transmit said first video stream.

9. The method of claim 8, wherein the synchronization signal is received by the network node with the second video stream portion.

10. The method of claim 8, wherein:
the network node comprises a unicast node;
the second stream portion is received at the unicast node from a higher network node; and
the synchronization signal is received at the unicast node from a multimedia broadcast/multimedia services node.

11. An apparatus comprising:
at least one data interface, at a second network node, adapted to receive a second video stream, said second video stream being an enhancement stream of a data stream, from a higher network node, and adapted to receive a synchronization signal for synchronizing said second video stream with a first video stream, said first video stream being a base stream of said data stream, from a first network node, said second network node having a larger bandwidth and covering a smaller geographic area than said first network node; and
a transceiver adapted to transmit, from said second network node, said second video stream in synchronism with said first video stream according to said synchronization signal when said second network node receives a request for said enhancement stream from a user equipment, without additionally transmitting said first video stream.

12. The apparatus of claim 11 comprising a unicast network node, wherein the synchronization signal is one of:
received over a direct link with a multimedia broadcast/multimedia services node;
the first video stream portion transmitted over a multicast channel by the multimedia broadcast/multimedia services node and received by the unicast network node; and
appended to the received second video stream portion.

13. A method comprising:
receiving from a first network node a first video stream including synchronization signaling, said first video stream being a base stream of a data stream;
receiving from a second network node a second video stream including synchronization signaling, said second video stream being an enhancement stream of a data stream, when said second network node receives a request for said enhancement stream, said second network node having a larger bandwidth and covering a smaller geographic area than said first network node;
combining the received first video stream with the received second video stream into a combined unitary stream, wherein the synchronization signaling synchronizes the first video stream and the second video stream; and
displaying the combined unitary stream to a user.

14. The method of claim 13, further comprising, prior to receiving the second video stream, sending to the second network node a request for the second video stream.

15. A device comprising:
- at least one transceiver adapted to receive from a first network node a first video stream including synchronization signaling, said first video stream being a base stream of a data stream, and adapted to receive from a second network node a second video stream including synchronization signaling, said second video stream being an enhancement stream of a data stream, when said second network node receives a request for said enhancement stream, said second network node having a larger bandwidth and covering a smaller geographic area than said first network node;
- a processor adapted to combine the received first video stream with the received second video stream into a combined unitary stream, wherein the synchronization signaling synchronizes the first video stream and the second video stream; and
- a graphical display interface coupled to the processor adapted to display the combined unitary stream to a user.

16. The device of claim 15 further comprising a buffer memory adapted to temporarily store at least one of the received first video and second video streams, wherein the processor is adapted to manage the buffer memory for synchronization of the first video stream and the second video stream so as to display the combined unitary stream.

17. The device of claim 15 comprising a mobile station, wherein the first network node comprises a multimedia broadcast/multimedia services node and the second network node comprises a unicast node.

18. The device of claim 15, wherein the at least one transceiver receives the first video stream over a multicast channel and receives the second video stream over a shared channel, wherein the multicast channel and the shared channel share a same frequency band.

19. The device of claim 15, wherein the at least one transceiver is adapted to send to the second network node a request for the second video stream prior to the at least one transceiver receiving the second video stream.

* * * * *